United States Patent
Brooks, Jr. et al.

[11] Patent Number: 6,145,188
[45] Date of Patent: Nov. 14, 2000

[54] FAN AND FOLD HEAD LEAD TERMINATION METHOD USING FLEX CABLE WITH EDGE TERMINATION PADS

[75] Inventors: William Woodrow Brooks, Jr.; Jerome Thomas Coffey; Todd Phillip Fracek; Richard Edward Lagergren; James Michael Rigotti; Marvin Allen Schlimmer, all of Rochester, Minn.

[73] Assignee: International Business Machines Corporation, Armonk, N.Y.

[21] Appl. No.: 08/922,841

[22] Filed: Aug. 26, 1997

Related U.S. Application Data

[62] Division of application No. 08/457,515, Jun. 1, 1995, Pat. No. 5,903,413.

[51] Int. Cl.[7] .................................................. G11B 5/127
[52] U.S. Cl. .................................. 29/603.03; 29/603.06; 360/106; 360/108
[58] Field of Search ............................ 29/603.03, 603.04, 29/603.06, 603.12, 603.17, 603.22; 360/104, 106, 108

[56] References Cited

U.S. PATENT DOCUMENTS

| | | | |
|---|---|---|---|
| 5,074,029 | 12/1991 | Brooks, Jr. et al. | 29/603 |
| 5,422,764 | 6/1995 | McIlvanie | 360/97.01 |
| 5,530,604 | 6/1996 | Pattanaik | 360/104 |
| 5,604,649 | 2/1997 | Hernandez | 360/104 |
| 5,708,541 | 1/1998 | Erpelding | 360/104 |

*Primary Examiner*—Carl E. Hall
*Assistant Examiner*—Davide Caputo
*Attorney, Agent, or Firm*—Matthew J. Bussan; Jack V. Musgrove; Andrew J. Dillon

[57] ABSTRACT

An actuator structure includes a flexure suspension with a flag appendage having a cantilevered portion extending parallel to the arm-suspension to form a gap therebetween. The flex cable that connects to the device electronics has an elongated portion secured to the side of the arm-suspension assembly presenting termination pads, which extend to the cable edge, along the elongated portion side and in alignment with the gap between arm-suspension and flag. The leads extending from the transducer are fanned out and extend across the gap. The leads are bonded to the arm-suspension and to the lead cantilevered portion immediately adjoining the gap. To terminate the leads, the flag is folded down 90 degrees, bringing the leads into contact with the te nation pads where they are ultrasonically bonded. The flag is then bent toward its original position causing the fine lead wires to separate between the flag cantilever portion bond and the ultrasonically bonded termination. As the flag is bent back, the fragile connections, between flag and flexure, rupture and the flag is separated from the balance of the arm-suspension assembly. In the assembled condition, the bonding of the fanned out lead wires to the arm-suspension provides strain relief.

2 Claims, 4 Drawing Sheets

FAN AND FOLD HEAD LEAD TERMINATION METHOD USING FLEX CABLE WITH EDGE TERMINATION PADS

This is a Division of application Ser. No. 08/457,515, filed Jun. 1, 1995, now U.S. Pat. No. 5,903,413.

FIELD OF THE INVENTION

The present invention pertains to rigid disk data storage devices and more particularly to a method and structure for terminating leads to interconnect the transducer with the device data handling electronics.

BACKGROUND OF THE INVENTION

Rigid disk data storage devices are ubiquitous in computer data processing systems and have become a highly competitive commodity product which must be economically produced in an environment of rapid technology advance and short product development cycles. Data integrity and device reliability must be retained while achieving both higher data areal densities and reduced device size. Enhanced structural designs enabled by improved fabrication techniques afford a competitive advantage in lager drives using a 3½ inch or 2½ inch form factor, but become essential as miniaturization progresses to the Personal Computer Memory Card is Industry Association (PCMCIA) type II standard wherein the overall dice size has respective approximate length and width dimensions of 3¼ and 2 inches and an overall height of 5 millimeters. In addition, it can be expected that even smaller devices will be used in the future.

No portion of the disk drive presents greater mechanical challenges than the actuator assembly wherein the transducer, which is moved rapidly from track to track during access and is maintained in precision alignment with an addressed track during data read and write operations, must be electrically connected to the arm electronics.

The connecting lead wires, which carry the read/write electrical signals, are less than 0.0002 inch in diameter and require attachment to both the transducer and the flex cable that electrically connects the actuator to the drive circuitry. Further, multiple leads are necessary for each transducer head since the state of the art device for enabling high density recording is the magnetoresistive (MR) head which is actually two transducer devices, an MR transducer for reading data and a thin film transducer for writing data The attachment of lead wires to both the transducer head and the flex cable, previously accomplished by largely manual soldering techniques, has been enhanced by positioning and alignment structures and methods that better adapt to automatic fabrication using ultrasonic bonding. Such an improved process and structure is shown in U.S. Pat. No. 5,074,029 (Brooks, Jr. et al.) assigned to the assignee of the present invention.

The cited patent teaches the use of a plastic tail portion that is molded about the end of the transducer supporting load beam to provide a window across which the lead wires are strung and positioned to permit pivotal movement of the wires spanning the window into alignment with flex cable contact pads to achieve the electrical connections. The plastic tail portion is progressively removed from the load beam and following the ultrasonic welding of the lead portions spanning the window to the corresponding flex cable pads, the last portion is rammed so that no part, of the tail portion form a part of the final assembly. This structure and technique enables the multiple leads to be aligned and attached in a single operation using smaller pad areas. However, the use of an intermediate part not only increases the cost, but also the cumulative tolerances involved including the pivoting of the positioned leads requires that the alignment of wires and pads be carefully checked prior to the final welding attachment operation.

SUMMARY OF THE INVENTION

In the structure of the present invention, an assembly is formed by laser welding the load beam/flexure, which supports the transducer head at the distal end, to the rigid actuator am A flag portion, formed as an integral part of the load beam/flexure, is used to retain the lead wires from the transducer in a fanned out orientation. The leads in the spaced apart, fanned out orientation extend across the space between the flag cantilevered portion and the flexure-arm assembly and are bonded to both the flexure-arm assembly immediately adjacent the edge of such flexure-arm assembly and to the flag cantilevered portion. The flex cable is supported along the side of the actuator arm in a plane substantially perpendicular to the plane defined by the fanned out leads wit terminal pads respectively aligned with the respective fanned out leads. To complete an electrical connection between the lead wires and the respective terminal pads, the flag is turned or bent 90 degrees to bring the lead portions between the flexure-arm assembly and the flag into a contacting, overlying position with the flex cable terminal pads. Ultrasonic bonding then effects both the removal of the insulating coating on the lead wires and electrically and mechanically securing the lead wires to the respective terminal pads.

The flag portion is tenuously attached to remainder of the flexure element and designed to fatigue after two 90 degree bends. The flag is first bent 90 degrees to bring the lead wires into contact with the flex cable terminal pads. Following the laser welding operation, the flag is bent upward toward the original coplanar relation with the remainder of the flexure which causes the fragile lead wires to break beyond the laser weld and the flag to separate from the balance of the flexure. Each of the lead wires is now bonded and stress relieved at the edge of the flexure-arm assembly with the portion extending therebeyond turned at substantially a right angle and terminating in a welded connection with a flex cable terminal pad.

The lead wire to flex cable connection is completed without using an intermediate part that not only increases cost but also adds cumulative tolerances which require careful alignment prior to welding and increases the number of erroneous connections that must be reworked. Further, the flex cable, extending along the arm at substantially a right angle to the plane determined by the fanned lead wires extending to the flag, enables the use of larger terminal pads along the flex cable margins rather than small terminal pads closely confined at the cable end, further reducing the opportunity for misregistration between lead wire and terminal pad.

DETAILED DESCRIPTION

Figure 1:
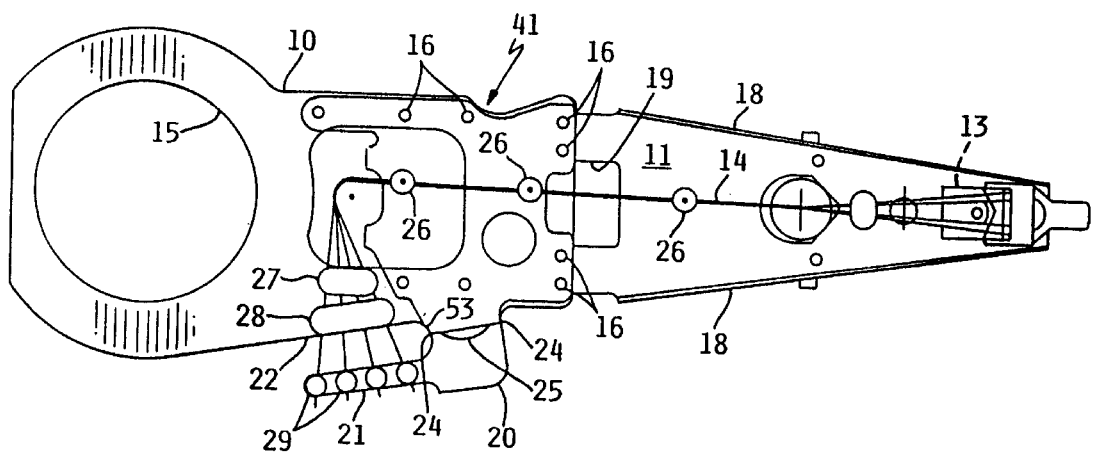
FIG. 1 shows an arm suspension assembly with the flexure including the flag appendage utilized in the present invention.
Figure 2:
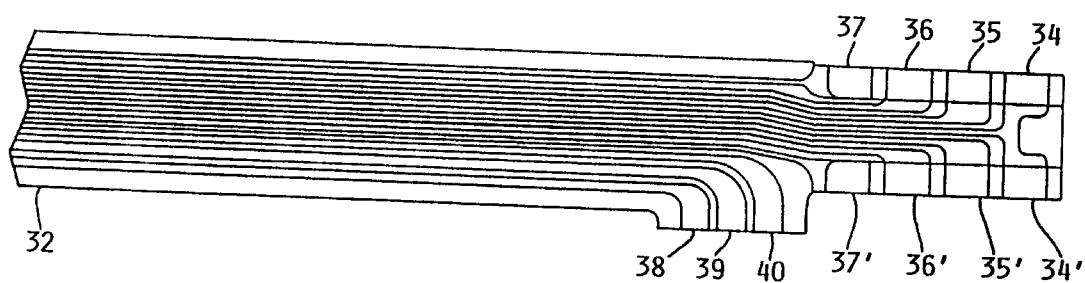
FIG. 2 shows a flex cable elongated element that is attached to an arm-suspension assembly and presents termination pads along the sides that extend to the cable edge.
Figure 3A:
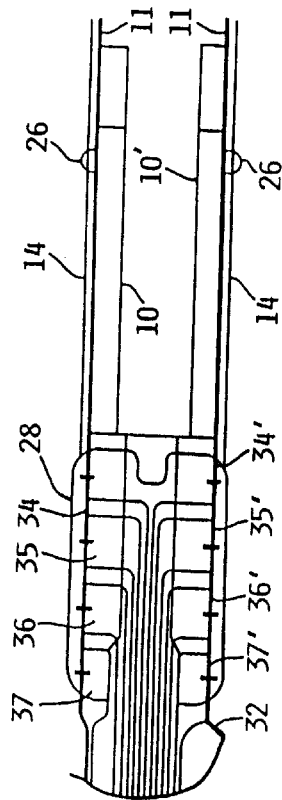
FIG. 3A is a broken away partial elevation of the actuator armature of FIG. 3 showing the ration pads following removal of the flag.
Figure 3:
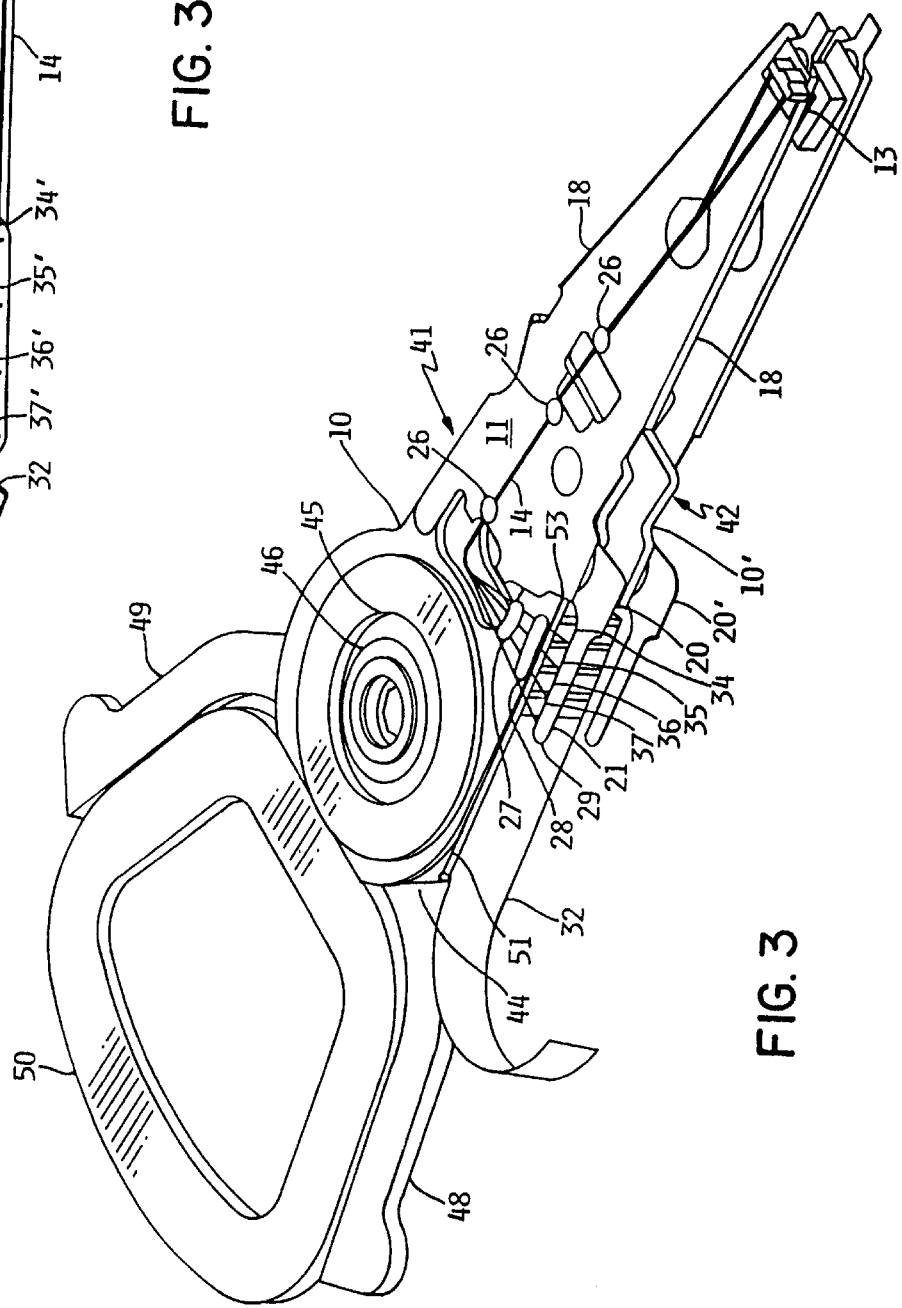
FIG. 3 illustrates a rotary actuator armature assembly including an arm with a pair of flexures attached and including flag appendages for terminating transducer leads to the flex cable and the drive electronics.

FIGS. 1, 2 and 3 illustrate a partial actuator assembly incorporating the present invention in the environment of a single disk rigid disk drive. FIG. 1 includes an arm 10 and attached load beam-flexure suspension 11 for supporting a transducer head 13 and also shows lead wires 14 extending from the transducer head. FIG. 2 shows a portion of the flex cable including the termination pads to which the lead wires from the transducer head are electrically connected. FIG. 3 is an assembly including two arm-suspension assemblies separated by a spacer which carries the voice coil all of which are supported about the outer race of a bearing and flier includes the flex cable end portion which has terminal pads aligned with the lead wires prior to the final steps during which the leads are soldered or ultrasonically bonded to the respective termination pads.

In FIG. 1 the substantially rigid actuator arm 10 includes a circular opening 15 through which is received the bearing about which the actuator armature assembly pivots. A load beam-flexure suspension 11 is attached to arm 10 by laser welds at nine sites 16 as shown in the figure. Suspension 11 includes a pair of flanges 18 which add rigidity to the flexure portion extending from arm 10. Intermediate the flanged portion and the locations of welded attachment to arm 10 the suspension is flat is with a central opening 19 to provide flexibility for one degree of freedom allowing the transducer head at the distal end of the suspension to rise and fall. Transducer head 13 is mounted adjacent the distal end of suspension 11 in a manner to afford pitch and roll of the head during relative motion between the head and the confronting, rotating data disk surface. Suspension 11 also includes a flag appendage 20 including a cantilevered portion 21 extending substantially parallel to the arm edge 22 and forming a gap therebetween. The flag 20 is joined to the balance of the suspension 11 by tenuous and fragile connecting portions 24 which are separated by an opening 25. The connecting portions 24 between flag 20 and the balance of suspension 11 directly overlie the edge of arm 10 and are designed to fatigue and fracture following two 90 degree bends of the flag appendage.

Signals to and from the transducer travel over lead wires 14 which terminate at one end in connections to the transducers supported on slider or head 13. The state of the art device for reading and recording data in the environment of very high density magnetic storage devices is a magnetoresistive (MR) head. Such a device is effectively two transducers since a thin film transducer is used to write data and an MR transducer is used for reading data. Accordingly, four leads are used to connect the transducers of the MR head to the device electronics. The four lead wires extending from the transducer are secured to the suspension by tacking with minuscule amounts of fast curing ultra violet (UV) adhesive at three locations 26. The lead wires 14 thereafter turn and are fanned out such that the four wires extend over the gap between arm 10 and cantilevered portion 21 with the same spacing as exists between the centerlines of the flex cable termination pads. The lead wires 14 are retained in the separated orientation by applying continuous strips of UV adhesive 27, 28 on the arm 10 and, as shown, to the flag by individual adhesive bonds 29. In practice, it is equally likely that a continuous strip of adhesive would be used on cantilevered portion 21 (as shown in FIG. 3). With the lead wires spanning the gap between bond sites 28 and 29, the wire portions in the gap can be stripped of insulation using laser technology to afford a more positive electrical connection when subsequently ultrasonically bonded to the terminal pad.

FIG. 2 shows that portion of the flex cable to which the lead wires from the transducers are connected. The portion of cable 32 illustrated includes ten longitudinally extending conductors that provide for transmission of signals to and from two transducers (which access opposite sides of a single disk) and for power to the voice coil that pivots the actuator. Cable termination pads 34, 35, 36 and 37 terminate lead wires from one transducer, while pads 34', 35', 36' and 37' terminate the lead wires from a second transducer. Leads 38, 39 are connected to the actuator voice coil (shown in FIG. 3) and a ground lead 40 resides between conductors leading to the voice coil and the signal lines communicating with the transducers. It will also be noted that a single conductor is connected to both read ground termination pads 34, 34'. By placing the termination pads along the margins of the flex cable rather than at the end, the pad size can be substantially enlarged. The flex cable termination pads and conductors are arranged to provide maximum pad size for soldering or ultrasonic bonding (the conductors have minimum spacing and the pads extend all the way to the cable edge). The common read ground and termination pad arrangement also minimizes the overall width of thee flex and bond area (reducing the overall assembly height or in the environment of a multiple disk drive, the disk to disk spacing).

The showing of FIG. 3 is an actuator armature assembly with a first, upper arm-suspension assembly 41 as seen in FIG. 1 and a second, lower arm-suspension assembly 42 which is a mirror image or "reverse plan" of the upper assembly 41 to present both sets of terminal leads and flag appendages at the same assembly side for connection to upper and lower termination pads of the same flex cable 32. The arm-suspension assemblies 41, 42 are axially separated by a spacer 44 and clamped or secured together and to the outer race 45 of bearing 46 for unitary pivotal movement about the axis of bearing 46. The spacer 44 also has secured thereto, a pair of arms 48, 49 which are bonded to and support the voice coil 50. The voice coil leads 38, 39 and ground lead 40 are folded beneath the armature assembly, as shown. The voice coil flex cable conductors extend around the bearing to present termination pads to which the ends of the voice coil are connected. Flex cable 32 rests against a stiffener plate 51 to which it is secured at the distal end in the region of the termination pads 34 trough 37. The length of contact between stiffener plate 51 and flex cable 32 is a function of the rotational position of the actor armature. As the armature moves in a clockwise direction, as viewed in FIG. 3, the length of contact decreases and when moving in a counterclockwise dion, the length of contact increases. The backing plate or stiffener 51 is secured to the upper and lower actuator arms 10 and 10' and alignment between terminal pads and lead wires is established by bonding stiffener 51 to arms 10, 10' while the end of the stiffener is abutting arm and suspension flexure edge surface 53.

The connection of lead wire portions in the gap between bond sites 28 and 29 to the respective termination pads 34 through 37 is accomplished by bending the upper flag 20 downward 90 degrees about an axis established by the weakened flag connections 24. With the leads overlying the respective termination pads, electrical connection is made by ultrasonic bonding of lead to pad. Following lead attachment at the respective termination pad, the flag appendage 20 is bent upward. The lead wires 14, being very small and ductile, readily separate between the ultrasonic bond and the bond site 29 on the flag cantilevered portion 21. As flag 20 pivots upwardly, the fragile connecting portions 24 securing the flag to the balance of flexure 11 fatigue and the appendage breaks away. Thereafter, the lower flag 20' is bent upward to align lead wires and termination pads, the leads are ultrasonically bonded and the appendage is turned downward to separate the flag from both the lead wires and the lower flexure. FIG. 3A illustrates the termination pads of flex cable 32 following removal of the flag appendages 20 and 20'.

Figure 4:
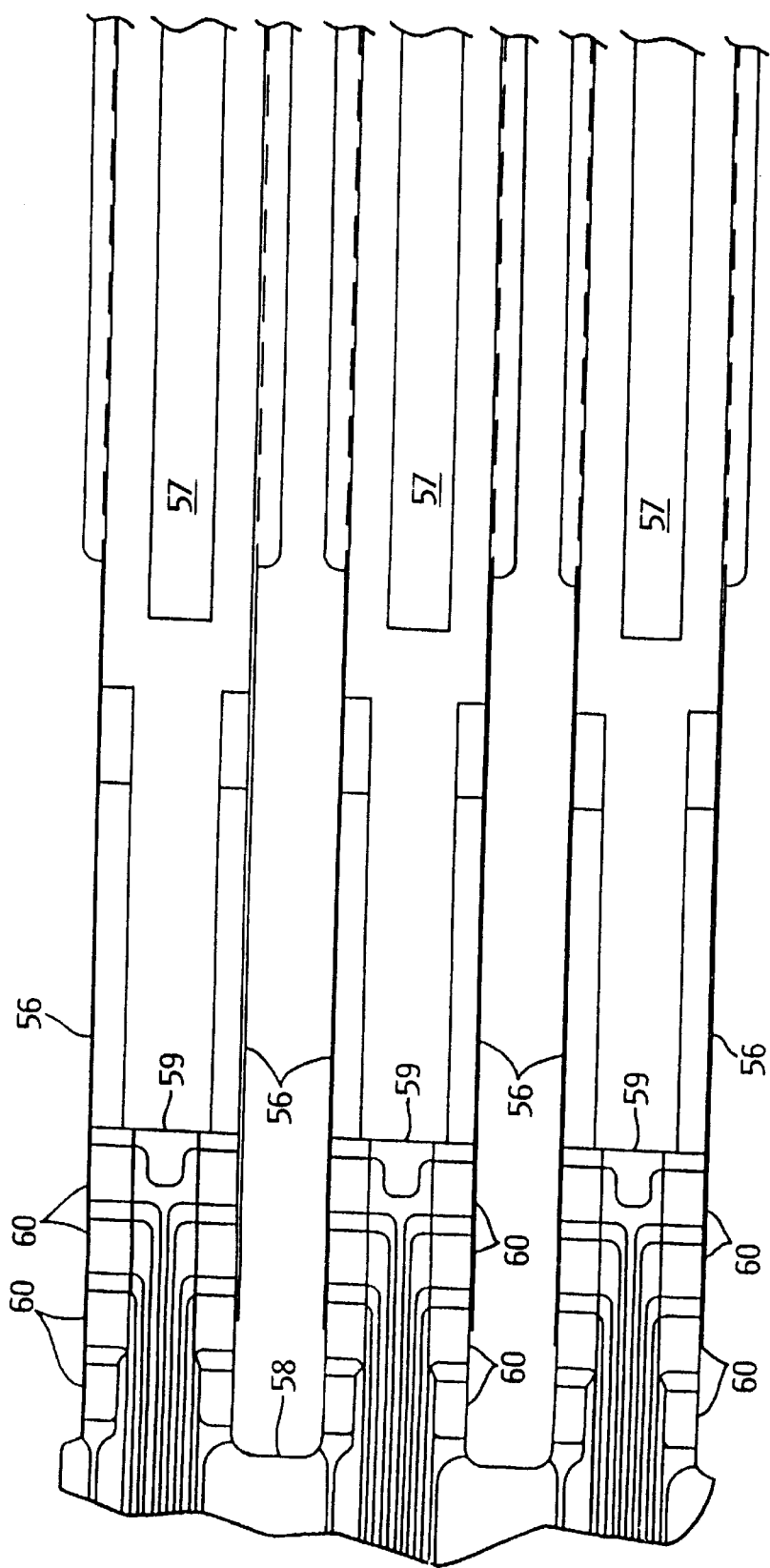
FIG. 4 shows broken away portions of arm-suspensions, disks and a flex cable with three elongated portions illustrating the invention in the environment of a multi disk drive.

The showing of FIG. 4 is similar to the illustrations of the earlier figures and is presented to illustrate the application of the invention to multiple disk drives. The actuator assembly includes six arm-suspension assemblies 56 which support transducers that write data to and read data from the six surfaces presented by three disks 57. The flex cable 58 includes three projecting portions 59, each of which present termination pads 60 along each side as in the cable portion of FIG. 2 to terminate lead wires from the six transducers.

Manual lead routing and manual soldering techniques are the largest single sources of actuator build defects. Such procedures use tapes to retain lead wires. The dispensing, handling and removal of such tapes plus the damage introduced by the necessity of handling fragile leads with tweezers and the mispositioning of lead wires during routing all reduce the yield of acceptable, functional devices. Compared with the use of a molded flag appendage and ultrasonic welding, the present structure (a metal flag formed integrally with the flexure member) uses a simplified stringing path and folds the wires perpendicular to the termination pads and is thus less sensitive to flex cable and flag positioning. Thus, no special tooling is required to assure precision alignment. The structure shown and described is adaptable to either manual or automated actuator build processes.

Figure 5:
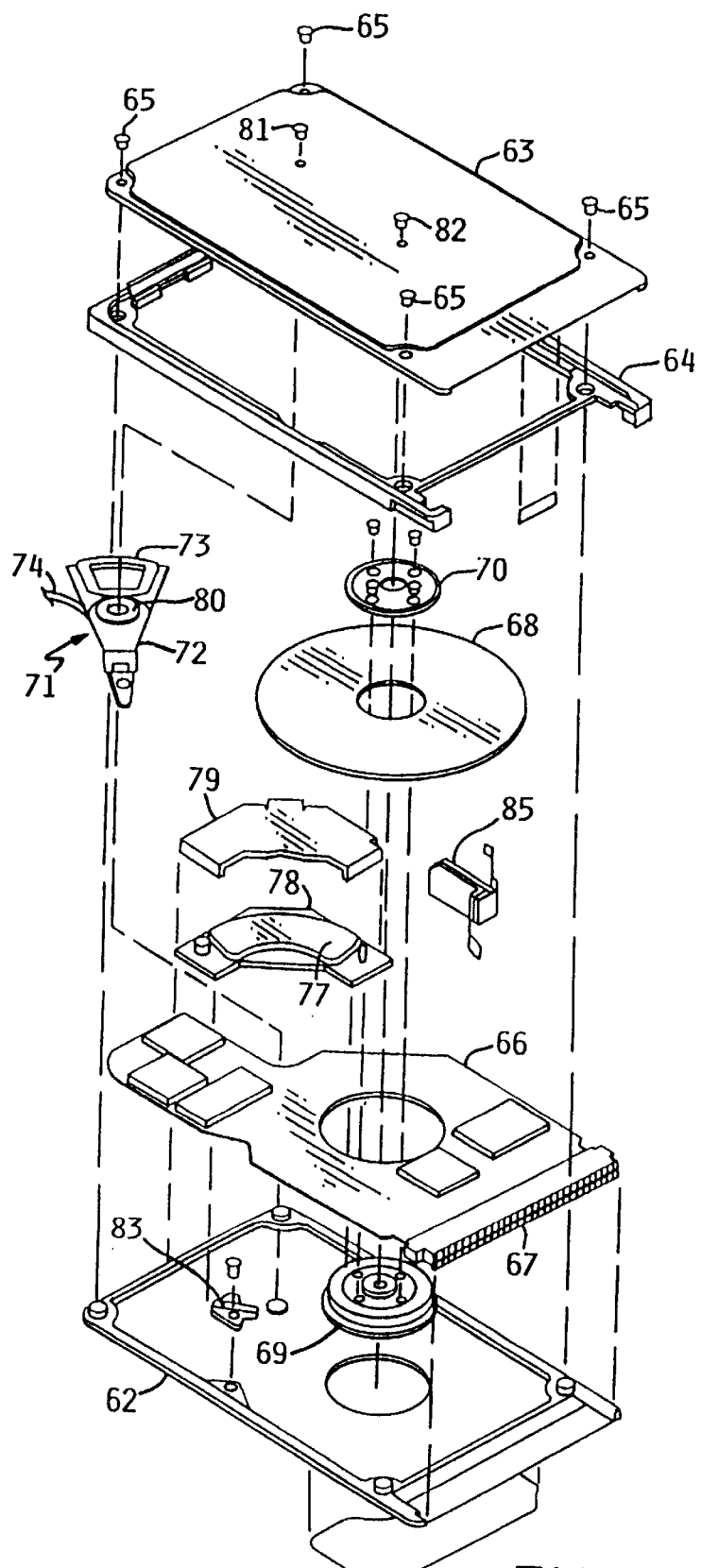
FIG. 5 is an exploded view of a PCMCIA type II rigid disk data storage device.

FIG. 5 is an exploded view illustrating a PCMCIA type II disk drive. Primary support is provided by base 62 with the enclosure completed by a cover 63 and gasket 64 secured to the base by a series of screws 65. The principal electronic components are mounted on the electronic carrier assembly 66 which has an end extending outside the enclosure and terminating in a connector 67. The disk 68 surrounds the spindle motor 69 and is clamped to the motor rotor portion by clamp 70. The actuator armature 71, which supports a pair of MR heads on flexures that are connected to arm 72, is driven by a voice coil 73 and electrically connect to the drive electronics on the electronic carrier assembly 66 by flex cable 74. The gap, in which the voice coil 73 is positioned, is created by magnet 77 supported on pole piece 78 and cover 79, which serves as the other pole piece, to concentrate magnetic flux in the gap. The post secured to the inner race of bearing 80, about which the actuator armature 71 rotates, is attached to both base 62 and cover 63 by screws 81 (one of which is visible). The disk spindle assembly is also supported by both the base 62 and cover 63 (screw 82). A ramp assembly 83 secured to base 62 includes upper and lower ramp elements which enable the heads to be lifted away from the disk surface when the actuator is not operating to read and write data. Actuator latch 85 secures the actuator armature 71 to retain the transducer heads in the unloaded condition. Since this type of drive is used in portable, battery powered applications, the actuator is moved to a park position, unloading the heads, with great frequency to implement power down when not reading or writing data and enable energy conservation.

While the invention has been particularly shown and described with reference to a preferred embodiment thereof, it will be understood by those skilled in the art that various changes in form and details may be made therein without departing from the spirit and scope of the invention.

What is claimed is:

1. A method of assembling an actuator arm/load beam flexure (arm/flexure) assembly to arm electronics electrically connected to a flex cable which presents termination pads along the sides thereof using a flag appendage, formed as a unitary part of said flexure and presents a cantilevered portion separated from the arm/flexure assembly for supporting a plurality of lead wires extending from a transducer comprising the steps of:

supporting a terminal portion of said flex cable adjacent said actuator arm to position said termination pads along a gap between said flag appendage cantilevered portion and [the balance] an edge surface of said arm/flexure assembly;

stringing said lead wires across said gap in fanned out orientation to effect alignment with respective termination pads;

bonding said lead wires to said arm/flexure assembly at each side of said gap;

bending said flag appendage from an original orientation to rotate said lead wires respectively into overlying, contacting relation to the termination pads;

electrically connecting said lead wires to the respective aligned termination pads by bonding each of said lead wires to a confronting one of the termination pads; and removing said flag appendage from said arm/flexure assembly by rotating said flag appendage toward the original orientation to induce fracture of a connection with the flexure and breaking the lead wires beyond the gap.

2. A method for fabricating an actuator arm assembly to a flexible cable comprising:

forming a transducer carrying suspension assembly including a flexure with a flag appendage secured to an edge surface of said flexure by fragile connecting portions and presenting a cantilevered portion;

securing said suspension assembly to an actuator arm with the flag appendage projecting away from an edge of said arm, said connecting portions overlying said edge of said arm and the cantilevered portion extending substantially parallel and spaced from said arm;

attaching to said arm an elongated flex cable portion which presents a plurality of termination pads at one side thereof which are aligned with a gap between said arm and said flag appendage cantilevered portion;

stringing intermediate portions of lead wires along the arm-suspension assembly with terminal portions of the wires fanned out and spanning said gap in respective alignment with said termination pads;

bonding each of the lead wires spanning said gap and aligned with a respective one of said termination pads to both said arm-suspension assembly and said flag appendage cantilevered portion adjacent said gap;

electrically bonding said lead wires spanning said gap respectively to said termination pads by bending said flag appendage from an original orientation to bring the lead wires spanning said gap into contact with the respective aligned termination pads; and removing said flag appendage from said suspension assembly by bending said flag appendage back toward the original orientation causing the said fragile connecting portions to fatigue and the lead wires to break between the termination pad bonding site and the flag appendage cantilevered portion.

\* \* \* \* \*

UNITED STATES PATENT AND TRADEMARK OFFICE
CERTIFICATE OF CORRECTION

PATENT NO. : 6,145,188
DATED : Nov. 14, 2000
INVENTOR(S) : William Woodrow Brooks, Jr; Jerome James Coffey; Todd Phillip Fracek; Richard Edward Lagergren; James Michael Rigotti; Marvin Allen Schlimmer It is certified that an error appears in the above-identified patent and that said Letters Patent is hereby corrected as shown below:

Column 6, Line 29 delete --[the balance]--.

Signed and Sealed this

First Day of May, 2001

*Attest:*

NICHOLAS P. GODICI

*Attesting Officer*  Acting Director of the United States Patent and Trademark Office